UNITED STATES PATENT OFFICE.

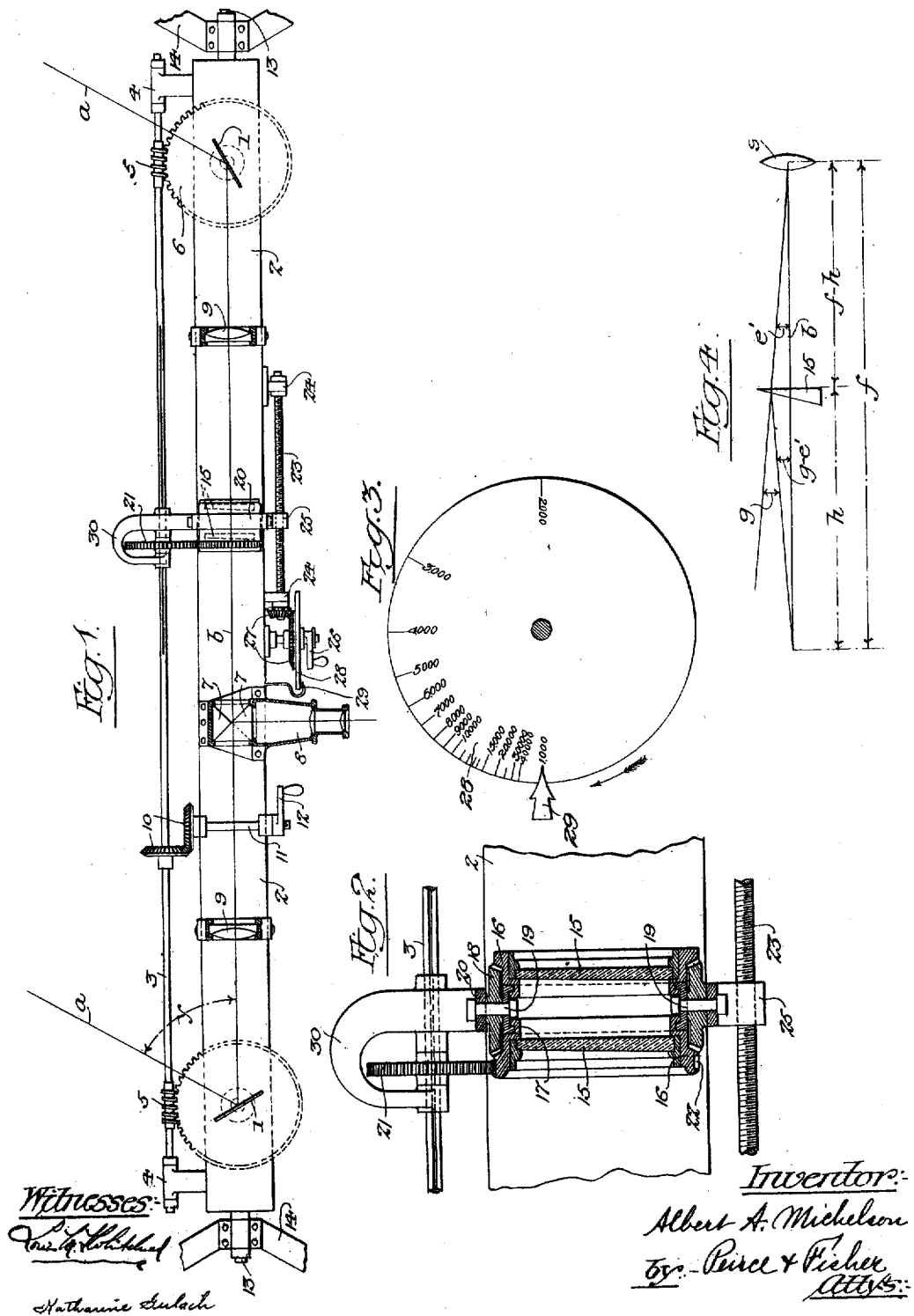

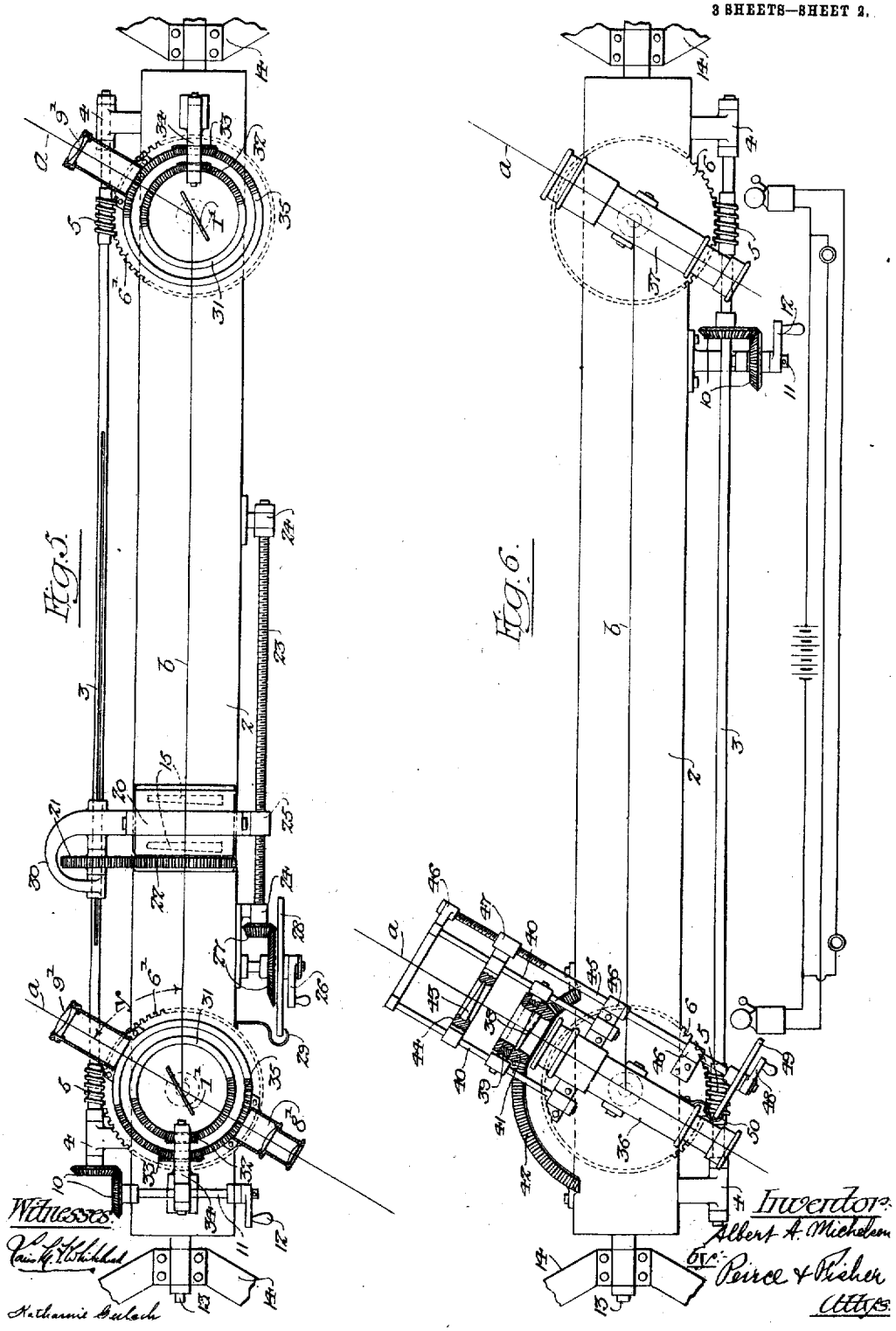

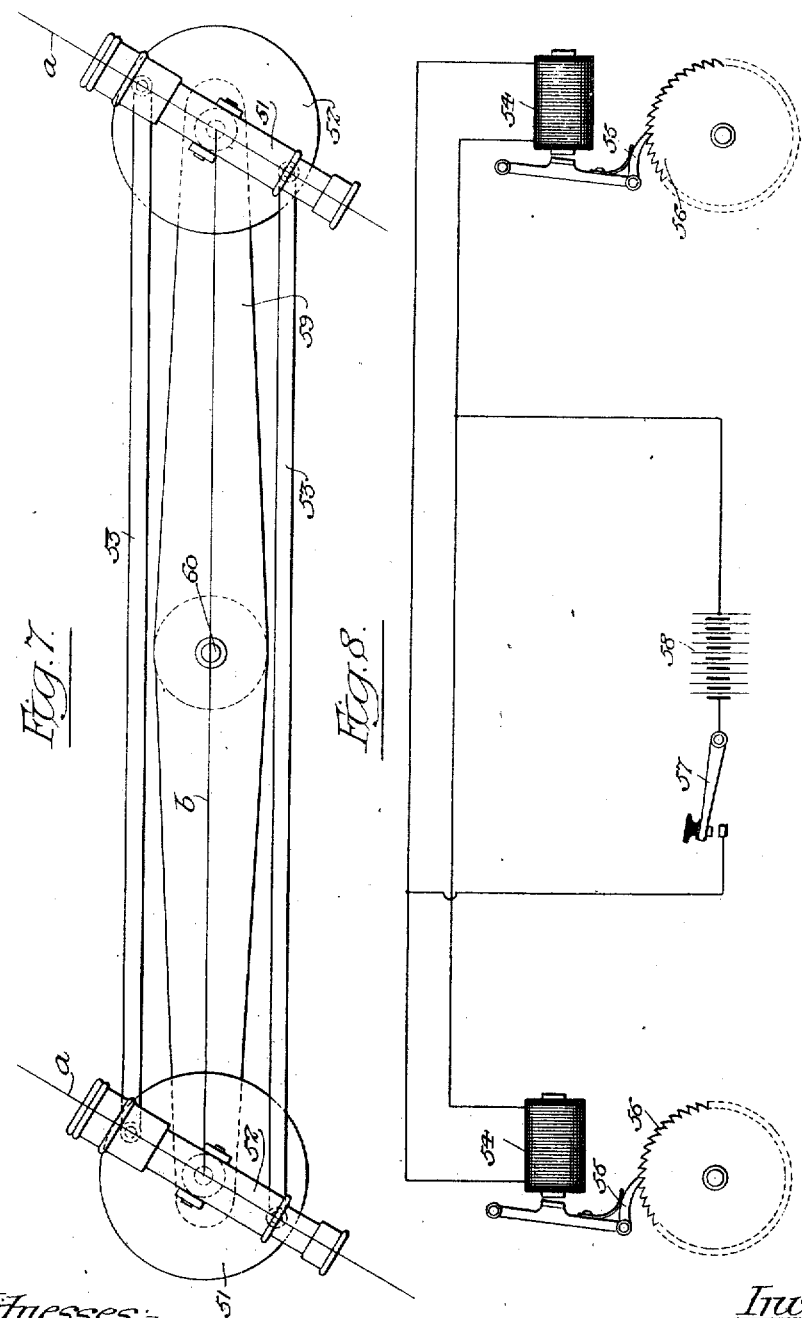

ALBERT A. MICHELSON, OF CHICAGO, ILLINOIS.

RANGE-FINDER.

No. 921,137.  Specification of Letters Patent.  Patented May 11, 1909.

Application filed June 18, 1908. Serial No. 439,144.

*To all whom it may concern:*

Be it known that I, ALBERT A. MICHELSON, a citizen of the United States, and a resident of Chicago, county of Cook, and State of Illinois, have invented certain new and useful Improvements in Range-Finders, of which the following is a specification.

The invention relates to range finders of the optical type wherein the determination of the range depends upon the angles formed by the rays of light which come from the target to the opposite ends of a known base line. Such range finders need not depend upon electric appliances, which are easily disarranged, but, heretofore, one or both of the devices for receiving the rays which come from the target, to the opposite ends of the base line of the finder, have been fixed with reference to the base line, so that the instrument as a whole must be swung about to direct it toward the target or other object whose range is to be ascertained. This arrangement necessarily limits the length of the base line of the finder and, in consequence, the angle subtended thereby at the object is small, so that the liability of error is great and the high magnification required, resulting in loss of light and vibration of the images, renders the observation difficult.

In accordance with the present invention, the ray receivers of the finder are rotatably mounted upon a suitable base, so that they may be directed toward the target, and suitable means are provided for maintaining the ray receivers in the same angular relation as they are rotated. Preferably, also, suitable means are provided for compensating for the varying angle between the ray receivers and the base line of the finder, so that the range may be read directly from the scale of the instrument.

The two ray receivers of the improved instrument are mounted to rotate about separate axes at the opposite ends of and at right angles to the base line of the finder to observe the object. Either telescopes or, preferably, suitable reflectors may be employed as the ray receivers. In making observations with the first form, the two telescopes at opposite ends of the base of the finder are rotated in the same angular relation until the image of the object is in alinement with the cross hairs of one of the telescopes. By any convenient adjustable means—preferably optical—the image of the object is then brought into alinement with the cross hairs of the other telescope. The extent of adjustment required to bring the image to the cross hairs of the second telescope is obviously proportional to the angle formed by the two rays which come from the object to the opposite ends of the known base line and affords a basis for immediate calculation of the range. If means are provided for compensating for the varying angle between the telescopes and the base line, the scale associated with the adjusting means may be so graduated that the distance of the object or target may be read directly therefrom. The form of the invention having two telescopes, of course, requires two observers so that, preferably, the ray receivers are in the form of reflectors which serve to bring the rays to a single observing instrument. These reflectors are mounted at opposite ends of the base of the finder and are rotatable in the same angular relation to each other to bring the target within the field of view of the instrument. A telescope having a single eye piece is arranged in line with one of the reflectors or, preferably, between the two, and an adjustable prism or prisms or other suitable means is employed to effect the alinement or coincidence of the rays from the object at the eye piece of the telescope. The required extent of adjustment can be used to calculate the range or to ascertain the same from a previously prepared table. Where means are employed to compensate for the angle between the reflectors and the base line, the range may be ascertained at once from a properly graduated scale associated with the adjustable part.

It is obvious that the invention may be embodied in many different arrangements, and that it provides a range finder of optical type in which a long base may be employed to increase the accuracy with which distances may be determined.

For a better understanding of the invention, reference is made to the accompanying drawings, in which:

Figure 1 is a diagrammatic plan view of the preferred form of the invention. Fig. 2 is a detail section of the adjustable prisms of the finder. Fig. 3 is a view of the graduated scale. Fig. 4 is a diagram. Figs. 5, 6 and 7 are diagrammatic plan views of other forms of the invention, and Fig. 8 is a diagrammatic plan view of a modification of the means employed for rotating the two ray receivers in definite relation.

In the form illustrated in Fig. 1, two reflectors or mirrors 1 are mounted upon a suitable base or frame 2 of any desired length. The mirrors are rotatable with reference to the frame about separate axes at opposite ends of and at right angles to the base line $b$ of the finder, so that the mirrors themselves may be rotated to bring the target within the field of view and it is not necessary to shift the entire instrument, as in prior constructions. Any suitable means may be provided for maintaining the mirrors in the same angular relation as they are rotated. In the form shown, a longitudinally extending shaft 3 is journaled at its ends in suitable bearings 4 fixed to the base or frame 2 and at its ends is provided with worms 5 which mesh with the teeth of a pair of circles or worm-wheels 6 which carry the rotating mirrors or reflectors 1. The worms 5 and worm-wheels 6 are of corresponding size so that a definite relation is maintained between the reflectors as they are rotated. That is, in the form illustrated, the angle between the mirrors remains the same. Two reflectors 7 are mounted upon the base intermediate the reflectors 1 and serve to reflect the rays which come from the target to the eye piece 8 of the telescope. This eye piece is fixed to the base or frame 2 of the instrument in proper position to receive the rays from the reflectors 7. Two objectives 9 are preferably arranged, as shown, between the two sets of reflectors 1 and 7. A pair of beveled gears 10 connect the longitudinal shaft 3 with a short shaft 11 journaled on the frame or base 2. This shaft is arranged adjacent the eye piece 8 and is provided on its forward end with a crank 12 by which the observer may readily shift the reflectors or mirrors 1 to bring the target within the field of the instrument. The frame or base 2 is preferably provided at its ends with trunnions 13 journaled in suitable bearings on supports 14 so that the entire instrument may be oscillated about an axis parallel to the base line $b$. By this arrangement, when the finder is employed on shipboard, the target may be maintained within the field of view, notwithstanding the rolling of the vessel and, when employed upon land, objects at different heights may be observed.

The two mirrors 1 are preferably so arranged that rays, as $a$, $a$, which come from an object at infinite distance will be rendered parallel before entering the eye piece 8, and the images observed will be in coincidence or alinement. Where the reflectors 7 are located directly on the line $b$ between the reflectors 1, the latter should preferably be arranged at right angles to each other and this relation will be maintained by the connecting gearing described, or by other suitable means. Any suitable means are provided to bring the images from an object at finite distance into coincidence or alinement. Preferably optical means, such as a prism or prisms, is employed for bending one of the rays from the target or other object at finite distance to bring the images into coincidence or alinement at the eye piece 8. The angle through which the ray is bent or deflected by the prism or other adjustable device will obviously be proportional to the angle which the base line $b$ subtends at the target. If this angle is $e$ and the distance or range $d$ is at right angles to the base line $b$, then since the angle $e$ is quite small, $$d = \frac{b}{e}.$$

But if the reflectors or mirrors 1 are shifted to bring the object into the field of view and the rays $a$, $a$ from the object are at an angle $y$ to the base line $b$, then, $$d = \frac{b \sin. y}{e}.$$

The base line $b$ is known, angle $y$ can be measured and angle $e$ can be determined, for example, by the adjustment required to effect the coincidence or alinement of the images, and the distance or range $d$ can thus be calculated or ascertained from a previously prepared table. Preferably, however, means are provided for compensating for the varying angle $y$ so that the range $d$ may be ascertained directly from a suitably graduated scale which is preferably associated with the adjustable means employed for effecting the coincidence or alinement of the images. Such means preferably comprises a prism that is connected to shift in definite relation with the rotating mirrors or ray receivers, and, preferably, the same prism that alines the images is also employed to effect this compensation. The method of compensation may be explained in connection with the diagram shown in Fig. 4, in which $f$ is the focal length of the objective 9 of the telescope; $e'$ is the angle between the ray from one of the reflectors and the base line $b$ and is equal to the angle $e$ subtended by the base line at the object; 15 is the adjustable prism; $g$ is the angle through which the ray is bent by the prism; and $h$ is the distance between the prism and the focus of the objective. As the angles are small $$e'(f-h) = h(g-e')$$

and $$\frac{f-h}{h} = \frac{g-e'}{e'}$$

or $$\frac{f}{h} = \frac{g}{e'}.$$

Therefore $$e' = \frac{h}{f}g.$$

But $e' = e$ and therefore $$e = \frac{h}{f} g.$$

Substituting this value of $e$ in the equation $$d = \frac{b \sin. y}{e}$$

gives $$d = \frac{b \sin. y}{\frac{h}{f} g}.$$

If angle $g$ is made a function of the sine of the angle $y$, i. e., a constant $l$ multiplied by sin. $y$, it gives $$d = \frac{b \sin. y}{\frac{h}{f} l \sin. y},$$

or $$d = \frac{b f}{h \, l}.$$

As $b$, $f$ and $l$ are all constants, the range $d$ equals a constant $c$ divided by the distance $h$ or $$d = \frac{c}{h}.$$

In the form of the invention illustrated, the angle $g$ is made a function of the sine of the angle $y$ or of the varying angle between the reflectors and the base line $b$ by connecting the prism 15 to rotate about its optical axis in definite relation to the rotation of the reflectors, and the images of the target are alined or brought into coincidence by adjusting the prism 15 in line with its optical axis to and from the focus of the objective 9 to vary the distance $h$, which distance is measured by a suitable scale. Then, since this distance $h$ and the range $d$ are only variables in the equation $$d = \frac{c}{h},$$

the scale can be so graduated as to give a direct reading of the range.

The preferred compensating and alining device comprises two prisms 15 that are fixed within annular frames or beveled gears 16 rotatably mounted in a ring 17. A pair of connecting beveled gears 18 are mounted on a pair of diametrically arranged studs 19 which connect the ring 17 to a suitable frame 20 that slides longitudinally on the base 2. The prisms are rotated in opposite directions about their optical axis by a gear 21 splined to the shaft 3 and meshing with an annular gear 22 formed on one of the prism frames and, as this rotation is thus made proportional to the shift of the reflectors 1, the varying angle between the latter and the base line can be neglected. The frame 20 is shifted to move the prisms 15 longitudinally in line with their optical axis by a screw 23, that is journaled in suitable bearings 24 on the base and engages a nut 25 on the frame. This screw is rotated from a suitable crank or handle 26 journaled on the base 2 by a pair of beveled gears 27, and an indicating scale or dial 28 is rotated with the handle and coöperates with a pointer 29 fixed to the instrument. Obviously, the scale may be employed to indicate the distance $h$ in the equation $$d = \frac{c}{h}.$$

But the constant $c$ for any given instrument may be determined once for all by observing an object at a known distance, say 1000 yards, and the scale or dial may then be suitably graduated as indicated in Fig. 3, so that the range may be read directly. The sliding frame 20 which carries the rotating prisms 15 is provided with an arm 30 which embraces the shaft 3 and the gear 21 thereon, so that the latter shifts longitudinally with the frame and rotates with the shaft to which it is splined.

Obviously, separately adjustable prisms could be employed for effecting the alinement of the images and the compensation of the varying angle between the reflectors and the base line, or a single prism that is rotatable and longitudinally shiftable could be used. Two oppositely rotating prisms, however, are preferred, since the images are then more readily kept in the field of view. The prism or prisms, moreover, could be shifted longitudinally to effect the compensation and rotated to effect the alinement or coincidence of the images, but the arrangement set forth is preferred.

In the form shown in Fig. 5, the objectives 9' are arranged in front of the reflectors 1' and are mounted upon the connected worm-wheels or supporting circles 6' at opposite ends of the base 2 to rotate in the same angular relation to observe the target. The reflectors or mirrors 1' are mounted on separate circles or rotating gear wheels 31, the axes of which coincide with the axes of worm wheels or circles 6'. Each circle 31 is connected to the corresponding circle 6' by intermediate gears 32 and 33 that are journaled in a bracket 34 fixed to the base 2. The gears 32 and 33 are connected together and mesh respectively with the gear 31 and a gear 35 on the circle 6'. The connecting gearing must be in the ratio of 1 to 2 so that the reflectors will be rotated through one-half of the arc through which the objectives 9' are shifted. The observing eye piece 8' could be centrally mounted on the base 2, as in the form shown in Fig. 1, in which case the reflectors would be maintained at right angles to each other. As shown, the eye piece is mounted on one of the circles 6' in line with the objectives 9' thereon and the reflectors are maintained in parallel relation. The arrangement of the compensating and alining prisms shown in connection with this form of the invention is similar to that previously described.

In the form of the invention shown in Fig. 6, two telescopes 36 and 37 are mounted on the rotating circles or worm wheel 6, and these circles are connected as described to maintain the telescopes in the same regular relation, preferably parallel as shown. The angle between the telescopes and the base line is compensated for by the prism 38 arranged in front of one of the telescopes. The frame of this prism is rotatably mounted in a ring 39 fixed to a pair of guides 40 that project from the circle 6. The frame of the prism is provided with a gear 41 meshing with an arc-shaped rack 42 that is fixed to the base 2, so that the prism rotates about its optical axis in definite relation to the shift of the telescopes. When the image is alined with the cross hairs of the telescope 37, the observer at that instrument signals to the observer at the telescope 36 by any suitable means such as the electric signaling devices indicated in the drawing. The image is then alined with the cross hairs of the telescope 36, by means of a prism 43, the frame 44 of which is mounted on the guides 40 to shift in line with the axis of the telescope. An adjusting screw 45, journaled in bearings 46 on the circle 6 and one of the guides 40, engages a nut 47 on the prism frame 43 to adjust the same. An operating crank handle 48 is provided on the inner end of the screw and a suitably graduated scale or dial 49 thereon coöperates with a pointer 50 fixed to the instrument to indicate the range.

It is obvious that numerous changes may be made in the details set forth without departure from the essentials of the invention.

Any suitable means may be employed for maintaining the ray receiving reflectors or telescopes in the same angular relation. For example, as shown in Fig. 7, the circles 51, which carry the telescopes 52, are connected and rotated in unison and in definite relation by a pair of parallel links 53, pivoted respectively to the circles at equal distances from the axes thereof. In Fig. 8 an electrical arrangement is illustrated for rotating the ray receivers in proper relation, and comprises a pair of magnets 54 that operate pawls 55 and ratchets 56 to rotate the supporting circles. A key 57 is arranged in the circuit leading from the battery 58 to the magnets 54 to effect the step-by-step operation thereof to rotate the circles and ray receivers carried thereby in definite relation.

While it is usually desirable to maintain the ray receiving telescopes parallel and the ray receiving reflectors either parallel or at right angles to each other, since then the accurate adjustment of the instrument may be readily effected, it is not necessary that they shall be exactly in such relation. It is only necessary that they shall be accurately maintained in the same angular relation. Any variation from the parallel or right angular relation in different range finders will be compensated for by the proper determination of the constant $c$ for each instrument. Indeed, it might be desirable to incline the ray receivers slightly toward each other, since then objects could be more readily brought into the field of view of the telescope or telescopes having a small field and large magnifying power.

While with the improved instrument, it is not necessary to rotate the base in observing the target, the invention could, nevertheless, be embodied in a range finder having a base mounted to swing in a horizontal plane with the ray receivers mounted thereon to rotate together relatively to the base. In this case the base could first be swung to approximately direct the finder toward the target and the ray receivers could then be quickly moved to bring the target into the field of view to determine its range. Such a rotatable base 59 for the ray receivers mounted on a vertical axis 60 is shown in Fig. 7.

It is obvious that other changes could be made without departure from the essentials of the invention.

Having described my invention, what I claim as new and desire to secure by Letters Patent, is:—

1. In a range finder, the combination of two ray receivers mounted to rotate in unison about separate axes to observe the object whose range is to be determined, and means for maintaining said ray receivers in the same angular relation as they are rotated.

2. In a range finder, the combination with a suitable base, of two ray receivers mounted on said base to rotate about separate axes to observe the object whose range is to be determined and suitable means connecting said ray receivers to compel the unison rotation thereof in the same angular rotation to each other.

3. In a range finder, the combination of two ray receivers mounted to rotate about separate axes at opposite ends of and at right angles to the base line of the finder, and suitable means for rotating said ray receivers in unison in the same angular relation to observe the object whose range is to be determined.

4. A range finder comprising a suitable base, two ray receivers mounted on said base to rotate in unison about separate axes at opposite ends of and at right angles to the base line of the finder to observe the object whose range is to be determined, means for maintaining said ray receivers in the same angular relation as they are rotated, and suitable means connected to shift in definite relation with said ray receivers to compensate for the varying angle between said ray receivers and the base line.

5. A range finder having a suitable base and two ray receivers mounted thereon to rotate in unison and in the same angular relation about separate axes at opposite ends of and at right angles to the base line to observe the object whose range is to be determined, and a prism connected to shift in definite relation with said ray receivers to compensate for the angle between them and the base line.

6. A range finder having a suitable base and two ray receivers mounted thereon to rotate in unison and in the same angular relation about separate axes at opposite ends of and at right angles to the base line to observe the object whose range is to be determined, and adjustable means for bending the ray which comes from the object to one end of the base line, said means coöperating with a suitable scale to determine the range.

7. In a range finder, the combination of a suitable base mounted to oscillate on a longitudinal axis parallel to the base line of the finder, a pair of ray receivers mounted on said base to rotate in unison about separate axes at opposite ends of the base line to observe the object whose range is to be determined, and means for maintaining said ray receivers in the same angular relation as they are rotated.

8. In a range finder, the combination with a telescope, of two reflectors mounted to rotate in unison about separate axes to observe the object whose range is to be determined and means for maintaining said reflectors in the same angular relation as they are rotated.

9. In a range finder, the combination with a telescope, of two reflectors mounted to rotate in unison on separate axes at opposite ends of and at right angles to the base line of the finder to observe the object and suitable means for effecting the alinement or coincidence of the rays which come from the object to the opposite ends of the base line at the eye piece of the telescope.

10. In a range finder, the combination with a telescope, of two reflectors mounted to rotate in unison and in the same angular relation about separate axes at opposite ends of and at right angles to the base line of the finder to observe the object, and means for compensating for the varying angle between said reflectors and the base line.

11. In a range finder, the combination with a telescope, of two reflectors mounted to rotate in unison and in the same angular relation about separate axes at opposite ends of and at right angles to the base line of the finder to observe the object, and a prism connected to shift in definite relation with said reflectors to compensate for the varying angle between them and the base line.

12. In a range finder, the combination with a telescope, of two reflectors mounted to rotate in unison and in the same angular relation about separate axes at opposite ends of and at right angles to the base line of the finder to observe the object, and an adjustable prism for effecting the alinement or coincidence of the rays at the eye-piece of the telescope.

13. In a range finder, the combination with a telescope, of two reflectors mounted to rotate in unison and in the same angular relation about separate axes at opposite ends of and at right angles to the base line of the finder to observe the object, and a prism connected to shift in definite relation with said reflectors to compensate for the varying angle between them and the base line, said prism being independently adjustable to effect the alinement or coincidence of the rays at the eye-piece of the telescope.

14. In a range finder, the combination with a suitable base mounted to oscillate upon a longitudinal axis parallel with the base line of the instrument, of a telescope and a pair of reflectors mounted on said base, said reflectors being rotatable in unison upon separate axes at opposite ends of and at right angles to the base line, means for maintaining said reflectors in the same angular relation as they are rotated, and means on said base for effecting the alinement or coincidence of the rays at the eye-piece of the telescope.

15. In a range finder, the combination with a suitable base mounted to oscillate upon a longitudinal axis parallel with the base line of the instrument, of a telescope and a pair of reflectors mounted on said base, said reflectors being rotatable in unison upon separate axes at opposite ends of and at right angles to the base line, means for maintaining said reflectors in the same angular relation as they are rotated, and a prism mounted on said base and connected to move in definite relation with said reflectors to compensate for the angle between them and the base line.

16. In a range finder, the combination with a base, of a telescope and a pair of reflectors mounted on said base, said reflectors being rotatable in unison and in the same angular relation upon separate axes at opposite ends of and at right angles to the base line of the finder, and two prisms interposed in the ray which comes from the object to one end of the base line and connected to rotate in opposite directions upon their optical axis and in definite relation to the rotation of said reflectors, said prisms being adjustable in line with their optical axis to effect the alinement or coincidence of the rays at the eye-piece of the telescope.

17. In a range finder, the combination of two ray receivers mounted at opposite ends of the base line of the finder to rotate in unison about separate axes to observe the object whose range is to be determined, means for maintaining said ray receivers in the same angular relation as they are rotated and suitable means connected to shift in definite relation with said ray receivers to compensate for the varying angle between said ray receivers and the base line.

18. In a range finder, the combination of two ray receivers mounted at opposite ends of the base line of the finder to rotate in unison and in the same angular relation about separate axes to observe the object whose range is to be determined and a prism connected to shift in definite relation to said ray receivers to compensate for the varying angle between them and the base line.

19. In a range finder, the combination of two ray receivers mounted at opposite ends of the base line of the finder to rotate in unison and in the same angular relation about separate axes to observe the object whose range is to be determined, means adjustable independently of the unison rotation of said ray receivers for bending the ray which comes from the object to one end of the base line and a suitable scale coöperating with said means to determine the range.

20. In a range finder, the combination with a telescope, of two reflectors, means for effecting the unison rotation of said reflectors in the same angular relation to observe the object and suitable means for effecting the alinement or coincidence of the rays which come from the object to said reflectors at the eye-piece of the telescope.

21. In a range finder, the combination with a telescope, of two reflectors mounted at opposite ends of the base line of the finder to rotate in unison about separate axes to observe the object, means for maintaining said reflectors in the same angular relation as they are rotated and an optical device connected to shift in definite relation with said reflectors to compensate for the varying angle between them and the base line.

22. In a range finder, the combination with a telescope, of two reflectors mounted at opposite ends of the base line of the finder to rotate in unison and in the same angular relation about separate axes and a prism connected to shift in definite relation with the said reflectors to compensate for the varying angle between them and the base line, said prism being independently adjustable to effect the alinement or coincidence of the rays at the eye-piece of the telescope.

23. In a range finder, the combination with a suitable base, of a telescope and a pair of reflectors mounted on said base, said reflectors being connected together and rotatable in unison and in the same angular relation upon separate axes at opposite ends of said base, and two prisms interposed in the ray which comes from the object to one end of the base line, said prisms being connected to rotate in opposite directions about their optical axes and in definite relation to the rotation of said reflectors and said prisms being adjustable in line with their optical axes independently of said reflectors to effect the alinement or coincidence of the rays at the eye-piece of the telescope.

ALBERT A. MICHELSON.

Witnesses:
HENRY L. CLAPP,
KATHARINE GERLACH.